United States Patent
Anglin et al.

(10) Patent No.: US 9,396,073 B2
(45) Date of Patent: Jul. 19, 2016

(54) OPTIMIZING RESTORES OF DEDUPLICATED DATA

(71) Applicant: International Business Machines Corporation, Armonk, NY (US)

(72) Inventors: Matthew J. Anglin, Tucson, AZ (US); David M. Cannon, Tucson, AZ (US); Avishai H. Hochberg, San Jose, CA (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 13/756,062

(22) Filed: Jan. 31, 2013

(65) Prior Publication Data
US 2013/0144840 A1 Jun. 6, 2013

Related U.S. Application Data

(63) Continuation of application No. 12/719,108, filed on Mar. 8, 2010, now Pat. No. 8,370,297.

(51) Int. Cl.
*G06F 11/20* (2006.01)
*G06F 11/14* (2006.01)

(52) U.S. Cl.
CPC ........ *G06F 11/1453* (2013.01); *G06F 11/1402* (2013.01); *G06F 11/1469* (2013.01); *G06F 11/2089* (2013.01)

(58) Field of Classification Search
CPC .................................................. G06F 11/208
USPC ......... 707/610, 611, 613, 616, 617, 618, 620, 707/624, 634–640, 661, 674, 802, 999.101, 707/999.204
See application file for complete search history.

(56) References Cited

U.S. PATENT DOCUMENTS

| | | | |
|---|---|---|---|
| 6,865,655 B1 | 3/2005 | Anderson | |
| 7,539,710 B1 | 5/2009 | Haustein et al. | |
| 2007/0100913 A1 | 5/2007 | Summer et al. | |
| 2008/0005201 A1 | 1/2008 | Ting et al. | |
| 2008/0270436 A1* | 10/2008 | Fineberg et al. | 707/101 |
| 2009/0112945 A1* | 4/2009 | Camble et al. | 707/204 |
| 2009/0177855 A1 | 7/2009 | Drews et al. | |
| 2009/0182789 A1 | 7/2009 | Sandorfi et al. | |

(Continued)

OTHER PUBLICATIONS

PCT/EP2011/053408 Written Opinion and International Search Report mailed May 5, 2011.

(Continued)

*Primary Examiner* — Syling Yen
(74) *Attorney, Agent, or Firm* — Kunzler Law Group (57) ABSTRACT

For restoring deduplicated data, a method maintains a chunk index on a client computing system coupled to a client data store. The chunk index tracks chunks within files remaining on the client data store after storage of the files to a deduplicated server data store coupled to a server computing system. The method determines whether a valid entry for a first chunk exists in the chunk index. In addition, the method retrieves the first chunk from the server data store responsive to determining the valid entry for the first chunk does not exist in the chunk index. The method further retrieves the first chunk from the client data store specified in the valid entry of the chunk index responsive to determining that the valid entry exists in the chunk index and the first chunk resides in a first file at a first offset.

20 Claims, 4 Drawing Sheets

(56) References Cited

U.S. PATENT DOCUMENTS

| | | |
|---|---|---|
| 2009/0204636 A1 | 8/2009 | Li et al. |
| 2009/0210640 A1 | 8/2009 | Davis |
| 2009/0265399 A1 | 10/2009 | Cannon et al. |
| 2009/0271454 A1 | 10/2009 | Anglin et al. |
| 2009/0300321 A1 | 12/2009 | Balachandran et al. |
| 2009/0313312 A1 | 12/2009 | Colbeck et al. |
| 2009/0319585 A1 | 12/2009 | Gokhale |
| 2010/0098092 A1 | 4/2010 | Luo et al. |
| 2010/0318759 A1* | 12/2010 | Hamilton et al. .............. 711/171 |
| 2011/0196829 A1* | 8/2011 | Vickrey et al. ................ 707/622 |
| 2011/0252071 A1* | 10/2011 | Cidon ............................ 707/802 |
| 2012/0023070 A1* | 1/2012 | Prahlad et al. ................ 707/652 |

OTHER PUBLICATIONS

Geer, D., "Reducing the Storage Burden via Data Deduplication", IEEE JNL Computer, vol. 41, Iss. 12, Dec. 2008, pp. 15-17.

Liu et al., "Semantic Data De-Duplication for Archival Storage Systems", IEEE CNF ACSAC, 13th Asia-Pacific, Aug. 4-6, 2009, pp. 1-9.

Yang et al., "FBBM: A New Backup Method with Data De-Duplication Capability", IEEE CNF, Inter. Conf. on Apr. 24-26, 2008, pp. 30-35.

Won et al., "Efficient Index Lookup for De-Duplication Backup Systems", IEEE International Symposium, Sep. 8-10, 2008, pp. 1-3.

* cited by examiner

| Hash value h(D) | Chunk length l(D) | Path(s) of the file(s) containing the chunk F(D) | Attributes of the file AF(D) | Offset of the chunk within the file OF(D) |
|---|---|---|---|---|
| D8AA7185DADA38D522BAF71745A8D72D9746EAC | 11776 | /Volumes/Data/file1 | size: 4096000 modify date: 11/06/2009 | 38021 |
| D8AA7185DADA38D522BAF71745A8D72D9746EAC | 11776 | /Volumes/Data/file2 | size: 8192000 modify date: 11/09/2009 | 921000 |
| A44B742C3B2D12F622114431DC3316EE35BC751BE1 | 11776 | /Volumes/Data/file1 | size: 4096000 modify date: 11/06/2009 | 41797 |

OPTIMIZING RESTORES OF DEDUPLICATED DATA

This is a continuation application of and claiming priority to U.S. patent application Ser. No. 12/719,108 entitled "APPROACH FOR OPTIMIZING RESTORES OF DEDUPLICATED DATA" and filed on Mar. 8, 2010 for Matthew J. Anglin, which is incorporated herein by reference.

FIELD

The present invention generally relates to data storage and retrieval operations performed within a data storage system. The present invention more specifically relates to techniques for optimizing the restoration of deduplicated data that is stored on a remote server within a data storage system.

BACKGROUND

Data deduplication provides a number of techniques to remove redundant data during a backup operation, thereby reducing required storage and potentially conserving network bandwidth. In a typical configuration, a disk-based storage system, such as a storage-management server or VTL (virtual tape library), has the capability to detect redundant data "extents" (also known as "chunks") and reduce duplication by avoiding the redundant storage of such chunks. For example, the deduplicating storage system could divide file A into chunks a-h, detect that chunks b and e are redundant, and store the redundant chunks only once. The redundancy could occur within file A or with other files stored in the storage system.

Known techniques exist for deduplicating data objects. In a typical client-server software system, deduplication during storage activities can be performed at the data source (client), data target (server), or on a deduplication appliance connected to the server.

The restoration of deduplicated data from the server to the client involves reconstruction of the data from deduplicated chunks. In current deduplication systems the reconstruction process takes place on the server that sends each chunk of the fully reconstructed data to the client. Moreover, even if the same chunk is found in many files (or even in the same file) selected for restore, that chunk will be restored and transmitted from the server to the client multiple times.

Although deduplication provides benefits for backup and storage of client data, it can adversely affect restore performance because of the time needed to reconstruct original data from numerous chunks, especially if those chunks are fragmented in the storage server (such as when the chunks are stored throughout multiple volumes, or the chunks have been migrated to a tape volume). Additional inefficiency arises because existing deduplication systems resend all data to the client without regard to whether that data already exists on the client. Techniques are needed to optimize the restore of deduplicated data to clients within data storage systems.

BRIEF SUMMARY

The present disclosure provides a number of techniques for optimizing the performance of deduplicating storage management systems. In particular, the presently described invention provides techniques for optimizing the restores of deduplicated data from a storage server.

One embodiment of the present invention provides for an enhanced storage and restore process, used when storing and restoring deduplicated files respectively within the storage management system. In addition to standard deduplication processing performed during storage activities such as backup, the client records a set of relevant storage attributes for a data chunk in a local client-accessible index or database. During a restore of this file from the storage server, the client will look up each chunk of the file in the local client-accessible index. If the index indicates that a local copy of the chunk is available, this local copy is used instead of transferring the data from the server. In the case that the chunk must be retrieved from the server, the index is updated with an entry to the newly retrieved chunk. Therefore, the client index is continually refreshed in an attempt to use as much data as possible from the client during subsequent file restores.

Some of the apparent advantages of the present invention include improved time for recovery from local disks, and less processing performed on the server-side storage system. Further, improved efficiency of restore processing may be achieved because the chunks need not be sent if they already exist on the client. Operation of the present invention may further result in reducing or even eliminating data transfer during restore of deduplicated data, conserving network bandwidth.

In one embodiment, a method for performing an optimized restore of data within a storage management system allows a restoration of data from a combination of client-side and server-side data stores. One example configuration of a storage management system described herein includes a client computing system that is coupled to a client data store (i.e., the original data source) and a server computing system that is coupled to a deduplicated server data store (i.e., the data backup target).

This method includes maintaining a chunk index or database on the client computing system to track the locations of chunks stored within files on the client data store. This index is updated when files stored to the server data store have a copy remaining on the client data store. Additionally, this chunk index may be updated for client copies of files as they are restored to the client data store. Thus, this chunk index may be used to maintain an updated directory of all locally stored copies of files and their chunks within the client data store.

During restoration of a specified file from the server data store to the client data store, the storage management system operates to retrieve chunks from server and client locations. For each chunk of the specified file, this will include determining whether a valid entry for the chunk exists in the client's chunk index. If a valid entry for the chunk does not exist in the chunk index, the chunk will be retrieved from the server data store. If a valid entry does exist in the chunk index, then the chunk will be retrieved from a location on the client data store as indicated in the chunk index. Finally, when all chunks are retrieved, the specified file will be reconstructed from the retrieved copies of the chunks and the specified file will be fully restored to the client data store.

Further embodiments provide the ability to manage and verify the restore operation and the data entries maintained in the client-side chunk index. One embodiment tracks a number of values in the chunk index to help locate and verify the chunk in the client data store, which may include a hash value of the chunk, a length of the chunk, a location of a file containing the chunk, file attributes of the file containing the chunk, and an offset of the chunk within the file containing the chunk.

Other embodiments include determining whether a valid entry for the chunk is provided by the chunk index, such as validating existence of the chunk at the file location specified in the chunk index entry; or verifying file attributes provided in the entry to verify that the file exists and is unchanged on the client data store. Another embodiment operates to retrieve the chunk from the server data store when unable to retrieve the chunk from the location on the client data store indicated in the chunk index. A still further embodiment operates to compare an end-to-end digest of the reconstructed specified file to a digest stored by the server computing system and therefore verify successful reconstruction of the specified file.

Another embodiment of the present invention provides for various server-side operations to enable the optimized restore of deduplicated data onto a client computing system from a server computing system. These operations include the steps of receiving data of a file from the client data store for storage to the server data store, and storing deduplicated chunks of the file within the server data store. Similar to the embodiments described above, the client computing system maintains an index or other tracking capability to track locations of file chunks remaining on the client data store after storage to the server data store.

Later, during a restore of the file to the client data store, one or more chunks of the file are provided from the server data store. The optimized restore operation includes providing the chunk from the server data store when the client computing system determines that one or more chunks needed to reconstruct the file do not exist on the client data store. This determination may be made through use of the client-side chunk index or other client tracking capabilities. Further, the server computing system may provide an end-to-end digest of the file to the client computing system to enable successful verification of the file restore to the client data store.

Other embodiments of the present invention provide for a storage management system configuration comprising a processor, a memory unit, and instructions stored within the memory unit for performing an optimized restore of data from the storage management system as described herein. Additionally, another embodiment of the present invention provides for a computer program product for performing the optimized restore of data from the storage management system, with the computer program product comprising a computer readable storage medium having computer readable program code embodied therewith to implement the techniques described herein.

DETAILED DESCRIPTION

One aspect of the present invention relates to techniques for enhancing the storage and retrieval of data within a deduplicating storage management system. The following describes storage and restore processing in a typical deduplication processing configuration using various aspects of the present invention. Those skilled in the art will recognize that the storage system configuration and the deduplication and retrieval sequences used within storage management systems may vary, but the storage and retrieval techniques described herein are also applicable to many other variations of storage management systems.

For example, in a storage management backup system that utilizes incremental backup, there is a large potential for improving restore performance when attempting to restore files to a client in order to overcome logical errors or trying to reconstruct to a previous point in time. The present invention leverages the attributes of incremental processing by making a heuristic assumption that many chunks needed to restore the files still exist on the local storage. The present invention is able to use these chunks by keeping a local index or database listing of chunks and their location on disk. Thus, it becomes possible to utilize this index and only restore chunks that are not found locally at restore time. Moreover, even if the disk is empty, by tracking any chunks that have been restored it is possible to eliminate the restore of duplicate chunks during the transfer of other chunks within the same file.

In summary, the optimized restore process applies some of the same logic performed in a backup during a data restore. During backup of the files with client-side deduplication, the client generally determines which chunks need to be sent to the server and which ones already exist on the server. In one embodiment of this invention, during restore the client will only retrieve the minimum number of chunks needed from the server to perform the restore, while retrieving all possible chunks for the restore from its client data store. This is accomplished through use of a client-side chunk index that helps indicate which chunks may be retrieved locally, and therefore which chunks need to be sent from the server with data.

The following disclosure provides a number of examples of typical backup and restore operations within a deduplicating storage management system. Those skilled in the art would recognize that the embodiments of the present invention would also include other storage operations not directly tied to a data backup, such as archival and space management. For simplicity, the following disclosure generally refers to backup and other storage activities transmitting data to the target server as "storing", and restoration or other retrieval activities from the target server as "restoring".

Figure 1A:
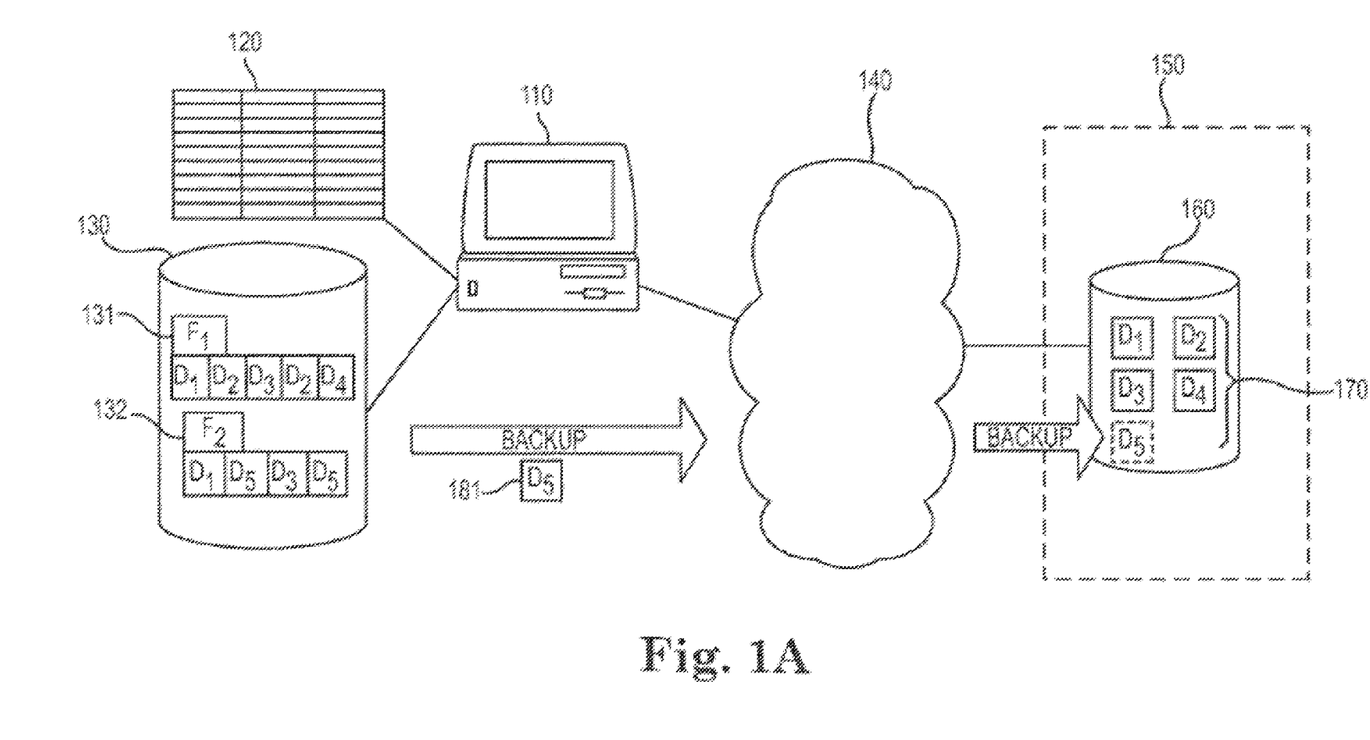
FIG. 1A illustrates an example configuration of a backup operation in a deduplicating storage management system according to one embodiment of the present invention.

FIG. 1A depicts an illustration of a deduplicating backup process in a storage management system occurring between a client 110 and a deduplicating storage server 150 according to one embodiment of the present invention. As shown, client 110 is connected to storage server 150 via a network 140. In the depicted storage operation, the client intends to back up file "$F_2$" 132 to a storage volume 160 within the storage server 150. Although only one storage volume is depicted, many storage volumes may exist in the storage management server, which may result in chunks from the same file being stored across many different storage volumes.

As shown, a deduplicated series of chunks 170 (specifically, unique data chunks $D_1$, $D_2$, $D_3$, and $D_4$) are already stored on the storage volume 160, and may be reassembled into one or more files as requested by the client 110. Thus, depicted file "$F_1$" 131 which remains on the client data store 130 and consisting of chunks $D_1$, $D_2$, $D_3$, $D_2$, and $D_4$ is shown as having been previously backed up to the storage volume 160.

The specific storage operation to be performed within FIG. 1A is the backup of file $F_2$ 132 to the storage volume 160. The file $F_2$ 132 consists of chunks $D_1$, $D_5$, $D_3$, and $D_5$. The client 110 performs client-side deduplication and determines which chunks are unique and not already stored in the storage server 150, and therefore only sends any necessary chunks to storage server 150. In this example, client 110 contacts the storage server 150 and discovers that chunks $D_1$ and $D_3$ are already stored and do not need to be sent. Client 110 further discovers that the remaining chunks in file $F_2$ are identical, so one copy of chunk $D_5$ needs to be sent for backup. Chunk $D_5$ is sent as in 181 over the network 140 and is ultimately stored within storage volume 160.

While this client-side deduplication process is being performed, all chunks of the file that are being sent up to the storage server 150 are also being tracked in a client-side index 120. This index keeps track of what chunks are stored on the client and remain even after a backup operation. Therefore, during the backup of file $F_2$ 132, the existence and the location of its chunks on the client are recorded in index 120. Further, during the backup of file $F_2$, not only is the transferred chunk $D_5$ tracked in index 120, but rather all chunks of $F_2$, including chunks $D_1$, the first instance of $D_5$, chunk $D_3$, and the second instance of chunk $D_5$, are recorded in the index.

Figure 1B:
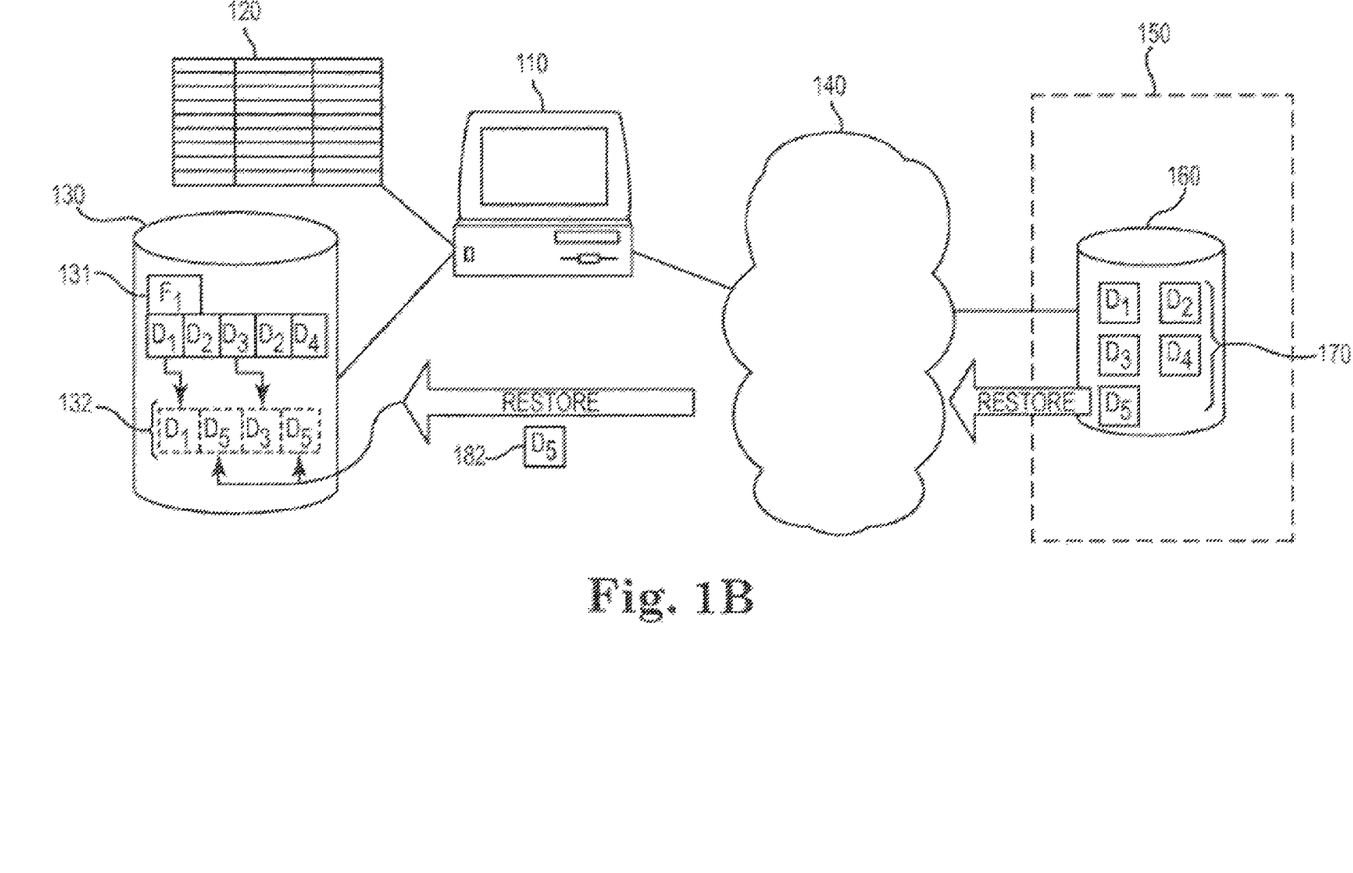
FIG. 1B illustrates an example configuration of a restore operation in a deduplicating storage management system according to one embodiment of the present invention.

FIG. 1B depicts an illustration of a restore operation according to one embodiment of the present invention. This restore operation is intended to restore the file $F_2$ in the case that file $F_2$ no longer exists on client data store 130. Again, file $F_2$ must be reconstructed from four data chunks: $D_1$, a first instance of $D_5$, $D_3$, and a second instance of $D_5$.

In this embodiment, the client 110 uses the client-side chunk index 120 to determine if any of the chunks needed for file reconstruction are stored locally on the client storage volume 130. From the index 120, the client can determine that chunks $D_1$ and $D_3$ are stored locally within file $F_1$, whereas $D_5$ is not stored in any local file and must be retrieved from the storage server 150. Thus, the client operates to reconstruct file $F_2$ 132 by retrieving chunks $D_1$ and $D_3$ from file $F_1$, and retrieving chunk $D_5$ from the storage server 150 (shown as being transmitted over network 140 as chunk $D_5$ 182).

Figure 2:
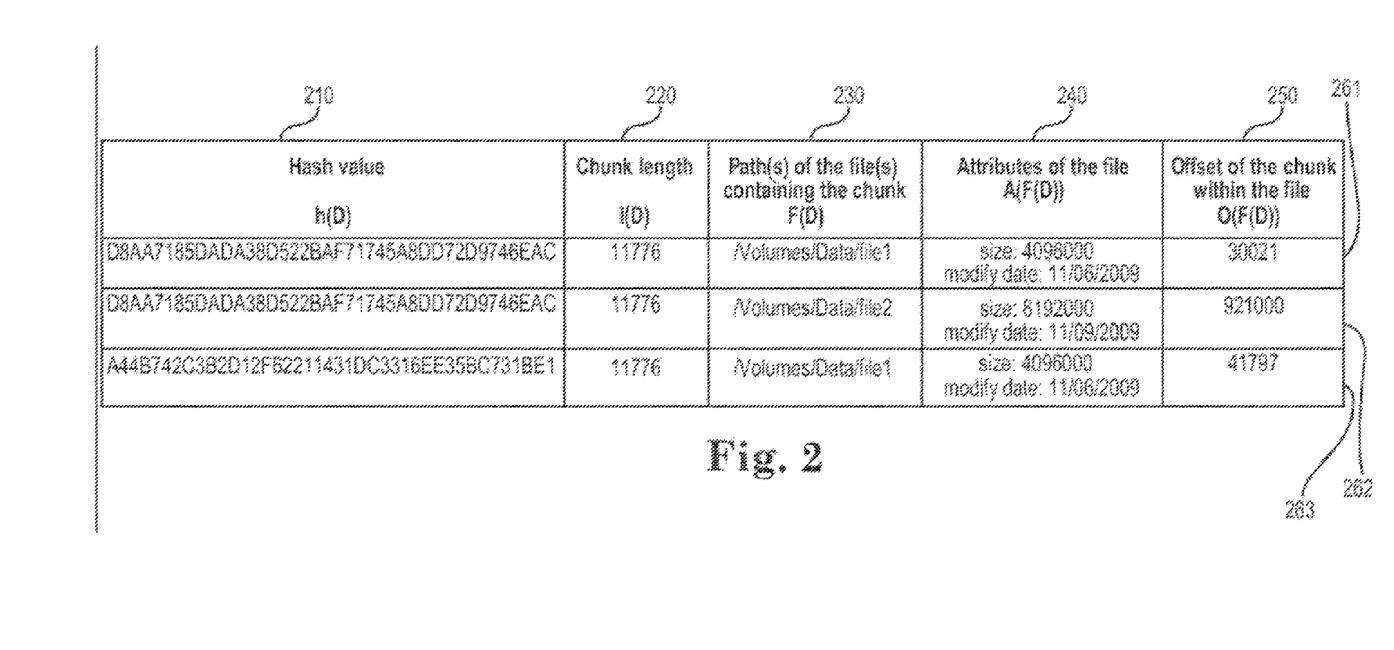
FIG. 2 illustrates an example configuration of a client-side chunk index used for improving performance of file restores in a deduplicated storage management system according to one embodiment of the present invention.

FIG. 2 provides a detailed example of the type of data that is stored in the client chunk index according to one embodiment of the present invention to enable the client to locate existing chunks on a client storage volume. As shown, five data fields are tracked for each instance of a chunk stored on the client: hash value 210, chunk length 220, file path 230, file attributes 240, and the offset of the chunk within the file 250. FIG. 2 further shows three entries in this index, 261, 262, and 263, for three chunks available in two files ("file1" and "file2") that remain stored on the client.

Specifically, the entries of the chunk index are produced as follows. The hash value 210 is produced from a hash generation (as typically done in deduplication processing, with use of a hash algorithm such as MD5 or SHA-1). The combination of the hash value 210 and the chunk length 220 may be used within the storage management system as the unique identifier for the chunk. Next, the file path 230 indicates the path to the file where the subject chunk can be found on the client. The file attributes 240 indicates the size of the file where the chunk may be found, along with a last modified date timestamp for the file. The client can use these file size and timestamp fields to verify that the file has not changed, and therefore that the chunk within the file location is unchanged and valid. Finally, the offset of the extent within this file 250 provides an indication of where in the file the chunk can be retrieved from once the file has been located.

The fields depicted in the FIG. 2 index are intended to store data indicating where a particular copy of a chunk is stored on the client, and further to indicate whether the file containing the chunk has been changed or modified. Thus, if the file containing the chunk has been removed, changed, or is inaccessible, the chunk may be retrieved from the server. Additionally, as shown, multiple entries for each unique chunk can exist within the index, due to the fact that multiple copies of the same chunk may remain in client storage in different file locations. Therefore, the client can attempt to retrieve the chunk from another file on the client if the first file containing the chunk has changed or cannot be accessed.

In summary, the purpose of maintaining a client chunk index is to keep track of chunks remaining on the client data store to enable use of as many client chunks as possible in lieu of retrieving each and every chunk from a remote storage server. Those skilled in the art would recognize that other types of data fields may be substituted or added to the index shown in FIG. 2 in order to keep track of the files and chunks stored within the client data store. Alternatively, other techniques may be used to determine whether a chunk is valid and unchanged on the client and is still available for use in reconstructing files.

The overall process for performing storage and restore operations with a deduplicating storage management system is further described within the following series of steps. Those skilled in the art would also recognize that additional steps may be substituted for other variations of deduplicating storage management systems.

Data Storing

First, the client identifies each data chunk D in file F. As part of a client-side deduplication process, the client generates a hash value h(D) for the data chunk D. Before continuing with the storage of data chunk D on the server, however, the client also records identifying attributes of the data chunk D in a locally-accessible index or database (such as the attributes and data fields outlined in FIG. 2).

The remaining steps of the client-side deduplication and backup process operate similar to existing deduplication processes including, for example, having the client querying the server to determine if the server already stores a data chunk with hash value h(D) and size l(D). If the server responds "yes", the client simply notifies the server that chunk with hash h(D) and size l(D) is a part of file F, and the server stores this information in its deduplication index. If the server responds "no", the client sends the data chunk D with its hash h(D) and size l(D) to the server, and the server stores data chunk D in a storage pool and enters h(D) and l(D) into its deduplication index. If more chunks are to be processed for the file, the above-described process is repeated.

Additionally, in a further embodiment, the client will also generate an end-to-end digest of the data file (with an algorithm such as cyclic redundancy check, MD5, SHA-1, SHA-256, SHA-512, or Whirlpool) and save it on the server. This digest will be subsequently used to validate the data during a restore operation, which is particularly useful for restoring files from chunks retrieved from a combination of client and server locations.

Data Restore

The process for restoring files from a storage server is likewise modified for use with the client-side chunk index according to the various embodiments of the present invention. The following restore process uses the client-side chunk index to retrieve as many chunks as possible from existing file locations within client-side data storage.

Figure 3:
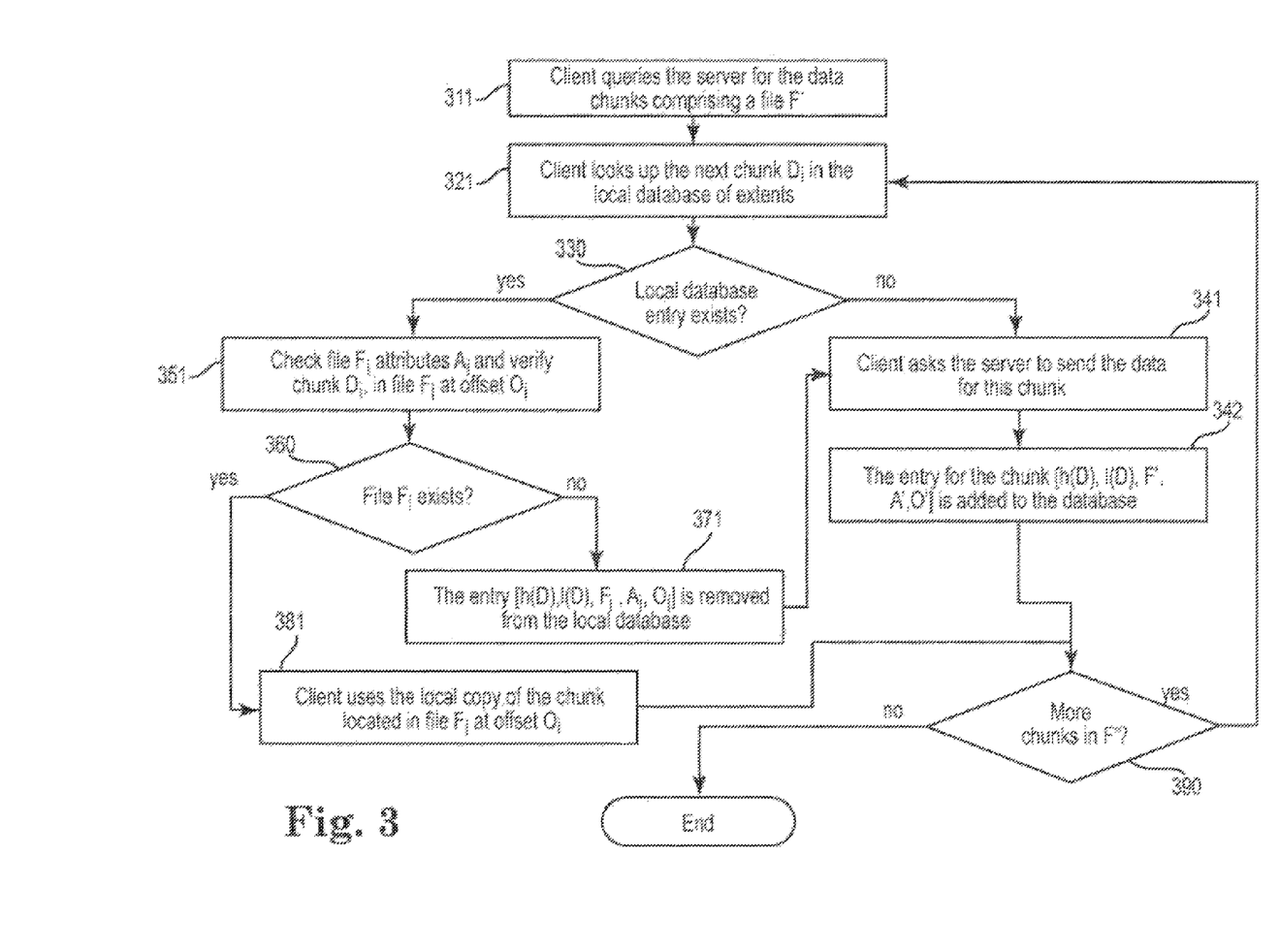
FIG. 3 illustrates an example flowchart of a restore process used for improving performance of file restores in a deduplicating storage management system according to one embodiment of the present invention.

FIG. 3 depicts an example flowchart of this restore process used for improving performance of file restores to a client according to one embodiment of the present invention. To proceed with a restore of a specific file to the client, first the client queries the server for a list of the data chunks comprising a file F' as in step 311. The server sends a response that the file consists of the following chunks: $[(h_1, l_1), (h_2, l_2) \ldots (h_n, l_n)]$ (signifying identifiers of each chunk, with h and l being the hash value and length of the chunk respectively). Next, the following process is repeated for each of the chunks 1-n.

For each of the chunks, the client looks up the chunk in its local index or database of chunks as in 321. If the local database does not have an entry for the chunk as in 330, the client asks the server to send the data for this chunk as in step 341. The local database is updated and the entry for the chunk [h(D), l(D), F', A', O'] is added to the client index as in step 342, with the F', A', and O' respectively indicating the location, attributes, and offset position of the retrieved chunk in the newly reconstructed file.

If an entry is found in the local index or database for the chunk as in 330, the following technique is conducted in an attempt to retrieve a local copy of the chunk from the client data store. The index will provide an entry that shows that chunk $D_i$ is stored in file location $F_i$ at offset $O_i$, the file $F_i$ having attributes $A_i$. Once this information is obtained from the client-side chunk index, a command will be issued to verify as in step 351 that file $F_i$ contains specified attributes $A_i$. This may include validating attributes such as validating the time stamp of $F_i$ to ensure that the file $F_i$ has not been modified since the entry was added to the cache. Further, a check may be performed verify that chunk $D_i$ is still contained in file $F_i$ at offset $O_i$.

If file $F_i$ does not exist, the chunk cannot be accessed, or the file has been modified as determined by different file attributes as in step 360, then the database will be updated to remove the entry for the unavailable chunk as in step 371. Because the copy of the chunk cannot be retrieved from a known location on the client, the client then asks the server to send the data for this chunk as in step 341. The local database is then updated as in step 342 to add an entry for the chunk in the file F' being reconstructed: the entry $[h(D), l(D), F_i, A_i, O_i]$ is updated with the new values of F' (the file that is being restored), A' (its attributes), and O' (offset within the file).

In a further embodiment, multiple entries for copies of the identical chunk may exist in the client side-chunk index. Therefore, if one of the entries in the client-side chunk index is invalid or otherwise points to a chunk that cannot be accessed, the other entries in the client-side chunk index are used. In lieu of retrieving the chunk from the server as in step 341, other local copies of the chunk $D_i$ as indicated in the client-side chunk index may be used for reconstruction of the file F'.

If the chunk $D_i$ is located within a file on the client as verified in 360, the client will use a local copy of the chunk. This local copy of the chunk is identified by values h(D) and l(D) and can be found in file $F_i$ at offset $O_i$ as in 381 as indicated by the client-side chunk index. The local copy of the chunk is accessed and is used to reconstruct this chunk's portion within file F'.

The restore process is repeated until there are no more chunks in F' as in 390, and the file F' is completely reconstructed. Additionally, in a further embodiment, after reconstructing the file from all of the chunks, the client generates an end-to-end digest of the reconstructed data file. The client compares a stored digest generated during the file storage to the digest now generated at restore time. If the two digests do not match, then the client will recognize that the correct data chunks were not successfully retrieved from the client and/or server. In response, the client will then retry the restore of the data, by retrieving all data chunks from the server rather than using any local copies of the data chunks.

In one embodiment, the client-side chunk index is updated during each storage and restore operation. Therefore, the client-side chunk index will contain constantly updated entries for files existing within the client data store, while further providing an opportunity for the client to retrieve data from the most recently accessed file on the client. Also, in one embodiment by enabling multiple entries to be written in the client-side chunk index for the same data chunk during the storage and restore operation, redundancy may be built into the retrieval of chunks on the client and multiple retrieval operations can be attempted as appropriate.

A further embodiment of the present invention enables adaptive rebuilding of data files on the client, even allowing chunks to be retrieved from client files while the data files are being built from chunks during the reconstruction process. Thus, a file containing duplicate chunks within itself may be partially rebuilt by using client-stored chunks retrieved from earlier server retrieval operations. This is due to the fact that as the file is being restored, entries for restored chunks are constantly being added to the client-side chunk index. Therefore, even if no chunks are initially stored on the client side, if a chunk is used later in the same file then a now-locally stored copy of the chunk can be used.

Although the illustrations provided above generally describe client-side deduplication activities, those skilled in the art would recognize that many of the techniques are also applicable with various operations of client-side, server-side, and appliance-based deduplication storage systems. Further, other variations to the structure and use of the client-side chunk index may be used to improve the operation of the above-described storage and restore techniques.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for restoring deduplicated data, the method comprising:
maintaining, by use of a processor, a chunk index on a client computing system coupled to a client data store, the chunk index tracking chunks within files remaining on the client data store after storage of the files to a deduplicated server data store coupled to a server computing system, wherein each chunk index entry for a chunk comprises a file path for a file, a file attribute indicating a file size of the file, and an offset position of the chunk within the file;
determining whether a valid entry for a first chunk exists in the chunk index;
retrieving the first chunk from the server data store responsive to determining the valid entry for the first chunk does not exist in the chunk index;
retrieving the first chunk from the client data store specified in the valid entry of the chunk index responsive to determining that a first file with a file size corresponding to a first file size of the valid entry resides at a first file path of the valid entry and that the first chunk resides at a first offset position of the valid entry; and
removing the valid entry from the chunk index responsive to determining that the first file with the file size corresponding to the first file size of the valid entry does not reside at the first file path and determining that the first chunk does not reside at the first offset position of the valid entry.

2. The method of claim 1, further comprising reconstructing the first chunk to a reconstructed file in the client data store.

3. The method of claim 2, further comprising updating the chunk index to track the first chunk within the reconstructed file.

4. The method of claim 2, further comprising retrieving the first chunk from the reconstructed file.

5. The method of claim 2, further comprising comparing a digest of the reconstructed file to a digest stored by the server computing system to verify successful reconstruction of the reconstructed file.

6. The method of claim 1, wherein for each chunk, the chunk index further comprises a hash value of the chunk and a length of the chunk.

7. The method of claim 6, further comprising checking the file attributes provided by the chunk index against the first file stored on the client computing system to verify that a valid version of the first file exists on the client data store.

8. A method for restoring deduplicated data, the method comprising:
receiving, by use of a processor, data of a first file from a client data store coupled to a client computing system;

storing deduplicated chunks of the first file to a deduplicated server data store coupled to a server computing system;

maintaining a chunk index on the client computing system, the chunk index tracking chunks within files remaining on the client data store after storage of the files to the server data store, wherein each chunk index entry for a chunk comprises a file path for a file, a file attribute indicating a file size of the file, and an offset position of the chunk within the file;

determining whether a valid entry for a first chunk exists in the chunk index;

retrieving the first chunk from the server data store responsive to determining the valid entry for the first chunk does not exist in the chunk index;

retrieving the first chunk from the client data store specified in the valid entry of the chunk index responsive to determining that the first file with a file size corresponding to a first file size of the valid entry resides at a first file path of the valid entry and that the first chunk resides at a first offset position of the valid entry; and removing the valid entry from the chunk index responsive to determining that the first file with the file size corresponding to the first file size of the valid entry does not reside at the first file path and determining that the first chunk does not reside at the first offset position of the valid entry.

9. A computer program product comprising a non-transitory computer readable storage medium having program code embodied therein, the program code readable/executable by a processor to:

maintain a chunk index on a client computing system coupled to a client data store, the chunk index tracking chunks within files remaining on the client data store after storage of the files to a deduplicated server data store coupled to a server computing system, wherein each chunk index entry for a chunk comprises a file path for a file, a file attribute indicating a file size of the file, and an offset position of the chunk within the file;

determine whether a valid entry for a first chunk exists in the chunk index;

retrieve the first chunk from the server data store responsive to determining the valid entry for the first chunk does not exist in the chunk index;

retrieve the first chunk from the client data store specified in the valid entry of the chunk index responsive to determining that a first file with a file size corresponding to a first file size of the valid entry resides at a first file path of the valid entry and that the first chunk resides at a first offset position of the valid entry; and remove the valid entry from the chunk index responsive to determining that the first file with the file size corresponding to the first file size of the valid entry does not reside at the first file path and determining that the first chunk does not reside at the first offset position of the valid entry.

10. The computer program product of claim 9, the program code further readable/executable to reconstruct the first chunk to a reconstructed file in the client data store.

11. The computer program product of claim 10, the program code further readable/executable to update the chunk index to track the first chunk within the reconstructed file.

12. The computer program product of claim 10, the program code further readable/executable to retrieve the first chunk from the reconstructed file.

13. The computer program product of claim 10, the program code further readable/executable to compare a digest of the reconstructed file to a digest stored by the server computing system to verify successful reconstruction of the reconstructed file.

14. The computer program product of claim 9, wherein for each chunk, the chunk index further comprises a hash value of the chunk and a length of the chunk.

15. The computer program product of claim 14, the program code further readable/executable to check the file attributes provided by the chunk index against the first file stored on the client computing system to verify that a valid version of the first file exists on the client data store.

16. A storage management system, comprising:
a client computing system;
a client data store coupled to the client computing system;
a server computing system connected to the client computing system via a network;
a deduplicated server data store coupled to the server computing system;
at least one processor within the storage management system; and
at least one memory store within the storage management system having instructions operable with the at least one processor for restoring deduplicated data, the instructions being executed for:
maintaining a chunk index on the client computing system, the chunk index tracking chunks within files remaining on the client data store after storage of the files to the server data store, wherein each chunk index entry for a chunk comprises a file path for a file, a file attribute indicating a file size of the file, and an offset position of the chunk within the file;
determining whether a valid entry for a first chunk exists in the chunk index;
retrieving the first chunk from the server data store responsive to determining the valid entry for the first chunk does not exist in the chunk index;
retrieving the first chunk from the client data store specified in the valid entry of the chunk index responsive to determining that a first file with a file size corresponding to a first file size of the valid entry resides at a first file path of the valid entry and that the first chunk resides at a first offset position of the valid entry; and
removing the valid entry from the chunk index responsive to determining that the first file with the file size corresponding to the first file size of the valid entry does not reside at the first file path and determining that the first chunk does not reside at the first offset position of the valid entry.

17. The storage management system of claim 16, the instructions further being executed for reconstructing the first chunk to a reconstructed file in the client data store.

18. The storage management system of claim 17, the instructions further being executed for updating the chunk index to track the first chunk within the reconstructed file.

19. The storage management system of claim 17, the instructions further being executed for retrieving the first chunk from the reconstructed file.

20. The storage management system of claim 17, the instructions further being executed for comparing a digest of the reconstructed file to a digest stored by the server computing system to verify successful reconstruction of the reconstructed file.

* * * * *